US011622590B2

(12) United States Patent
O'Connell

(10) Patent No.: US 11,622,590 B2
(45) Date of Patent: Apr. 11, 2023

(54) HELMET ACCESSORY MOUNT SYSTEM

(71) Applicant: Gentex Corporation, Simpson, PA (US)

(72) Inventor: Jason W. O'Connell, Raynham, MA (US)

(73) Assignee: Gentex Corporation, Simpson, PA (US)

( * ) Notice: Subject to any disclaimer, the term of this patent is extended or adjusted under 35 U.S.C. 154(b) by 157 days.

(21) Appl. No.: 17/044,415

(22) PCT Filed: Apr. 5, 2019

(86) PCT No.: PCT/US2019/026111
§ 371 (c)(1),
(2) Date: Oct. 1, 2020

(87) PCT Pub. No.: WO2019/195760
PCT Pub. Date: Oct. 10, 2019

(65) Prior Publication Data
US 2021/0030098 A1 Feb. 4, 2021

Related U.S. Application Data

(60) Provisional application No. 62/653,034, filed on Apr. 5, 2018.

(51) Int. Cl.
A42B 3/04 (2006.01)
G02B 23/12 (2006.01)
G02B 23/16 (2006.01)

(52) U.S. Cl.
CPC .......... *A42B 3/0406* (2013.01); *G02B 23/125* (2013.01); *G02B 23/16* (2013.01)

(58) Field of Classification Search
CPC .............................. A42B 3/0406; A42B 3/042
USPC ........................................................... 2/422
See application file for complete search history.

(56) References Cited

U.S. PATENT DOCUMENTS

| 2,421,643 | A | | 6/1947 | Ostli | |
| 4,449,787 | A | | 5/1984 | Burbo et al. | |
| 4,660,943 | A | * | 4/1987 | Ellis | A42B 3/042 |
| | | | | | 359/362 |
| 8,209,780 | B1 | | 7/2012 | Lemire | |
| 9,622,530 | B2 | * | 4/2017 | DiCarlo | A42B 3/042 |
| 9,781,963 | B1 | * | 10/2017 | Celona | A42B 3/223 |

(Continued)

OTHER PUBLICATIONS

Examination Report No. 2 dated Jun. 17, 2021 for Australian Patent Application No. 2019247501, 6 pages.

(Continued)

Primary Examiner — Timothy K Trieu
(74) Attorney, Agent, or Firm — Morgan, Lewis & Bockius LLP

(57) ABSTRACT

A helmet accessory mount system may include a shroud configured to be coupled to a helmet and an arm assembly having a first arm configured to rotatably couple to the shroud. The system may also include an accessory interface configured to coupled to an accessory and configured to engage the arm assembly. The arm assembly may be configured to move from a deployed position to at least one storage position. The accessory may be configured to be positioned between the accessory interface and the helmet when the arm assembly is in the at least one storage position.

17 Claims, 14 Drawing Sheets

(56) References Cited

U.S. PATENT DOCUMENTS

| | | | |
|---|---|---|---|
| 11,327,291 B2* | 5/2022 | Appel | A42B 3/042 |
| 2007/0214551 A1 | 9/2007 | Teetzel et al. | |
| 2012/0002046 A1 | 1/2012 | Rapoport et al. | |
| 2014/0327962 A1 | 11/2014 | Teetzel et al. | |
| 2015/0002930 A1 | 1/2015 | Teetzel et al. | |
| 2020/0400934 A1* | 12/2020 | Appel | A42B 3/0406 |

OTHER PUBLICATIONS

International Search Report and Written Opinion for International Patent Application No. PCT/US2019/026111, 7 pages.

\* cited by examiner

HELMET ACCESSORY MOUNT SYSTEM

CROSS REFERENCE TO RELATED APPLICATIONS

This application is a U.S. National Phase of International Application No. PCT/US2019/026111 filed on Apr. 5, 2019, which claims the benefit of U.S. Provisional Patent Application No. 62/653,034 filed Apr. 5, 2018 entitled "Accessory Mount System", each of which is incorporated by reference herein in its entirety.

FIELD OF THE INVENTION

The present application generally relates to a helmet accessory mount system and, more particularly in some embodiments, to an accessory mount system for attaching night vision goggles (NVG) to a helmet.

BRIEF SUMMARY OF THE INVENTION

In one embodiment there is a helmet accessory mount system including a shroud configured to be coupled to a helmet and an arm assembly having a first arm configured to rotatably couple to the shroud. The system may also include an accessory interface configured to couple to an accessory and configured to engage the arm assembly. The arm assembly may be configured to move from a deployed position to at least one storage position. The accessory may be configured to be positioned between the accessory interface and the helmet when the arm assembly is in the at least one storage position.

The arm assembly may include a second arm configured to rotatably couple to the first arm and configured to rotatably couple to the accessory interface. The arm assembly may be configured to position the accessory proximate a top of the helmet closest to an uppermost portion of a user's head when the arm assembly is in the at least one storage position. The accessory interface may be configured to be positioned between the accessory and the helmet when the arm assembly is in a second storage position. The accessory interface may be configured to be positioned between the accessory and the helmet when the arm assembly is in a second storage position. The first arm may be rotationally fixed relative to the shroud as the arm assembly moves from the deployed position to the second storage position.

The second arm may rotate relative to the first arm as the arm assembly moves from the deployed position to the second storage position. The second arm may flip from the deployed position to the second storage position.

In a further embodiment, the accessory mount system includes an accessory coupled to the accessory interface and the first arm may be configured to be positioned within a recess of the accessory when the arm assembly is in one of the plurality of storage positions. In a further embodiment, the accessory mount system includes an accessory coupled to the accessory interface and the accessory may be within 150 millimeters of a surface of a helmet when the accessory is in the at least storage position. The shroud may include a ledge, the arm assembly may include a receiving area, and the ledge may be within the receiving area when the arm assembly is in the deployed position.

The shroud may include an opening, and the second arm may include a locking element at least partially within the opening of the shroud when the arm assembly is in the deployed position. The first arm may include a track and the locking element may be within the track when the arm assembly is in the at least one storage position. The first arm may rotate relative to the shroud and the second arm may rotate relative to the first arm when the arm assembly moves from the deployed position to the at least one storage position. The first arm and the second arm may rotate simultaneously. The helmet may include an outer surface, the accessory may include an accessory surface, and a distance from the outer surface to the accessory surface may be less than one inch when the arm assembly in the at least one storage position. The second arm may be adjacent opposing sides of the first arm when the arm assembly is in the at least one storage position.

In a further embodiment, an accessory mount system comprises a shroud configured to couple to a helmet, a first arm having a first end rotatably coupled to the shroud, a second arm rotatably coupled to a second end of the first arm, and an accessory interface coupled to the second arm and configured to couple to an accessory. The accessory interface may be moveable between a deployed position and a plurality of storage positions. The accessory may be configured to be positioned between the accessory interface and the helmet when the accessory interface is in a first position of the plurality of storage positions. The accessory interface may be configured to be positioned between the accessory and the helmet when the accessory interface is in a second position of the plurality of storage position. The accessory interface may be configured to be proximate a top of the helmet closest to an uppermost portion of a user's head when the accessory interface is in a third position of the plurality of storage positions.

BRIEF DESCRIPTION OF THE SEVERAL VIEWS OF THE DRAWINGS

The following detailed description of embodiments of the helmet accessory mount system will be better understood when read in conjunction with the appended drawings of an exemplary embodiment. It should be understood, however, that the invention is not limited to the precise arrangements and instrumentalities shown. For example, although not expressly stated herein, features of one or more various disclosed embodiments may be incorporated into other of the disclosed embodiments.

In the drawings.

DETAILED DESCRIPTION OF THE EXEMPLARY EMBODIMENTS OF THE INVENTION

Figure 1:
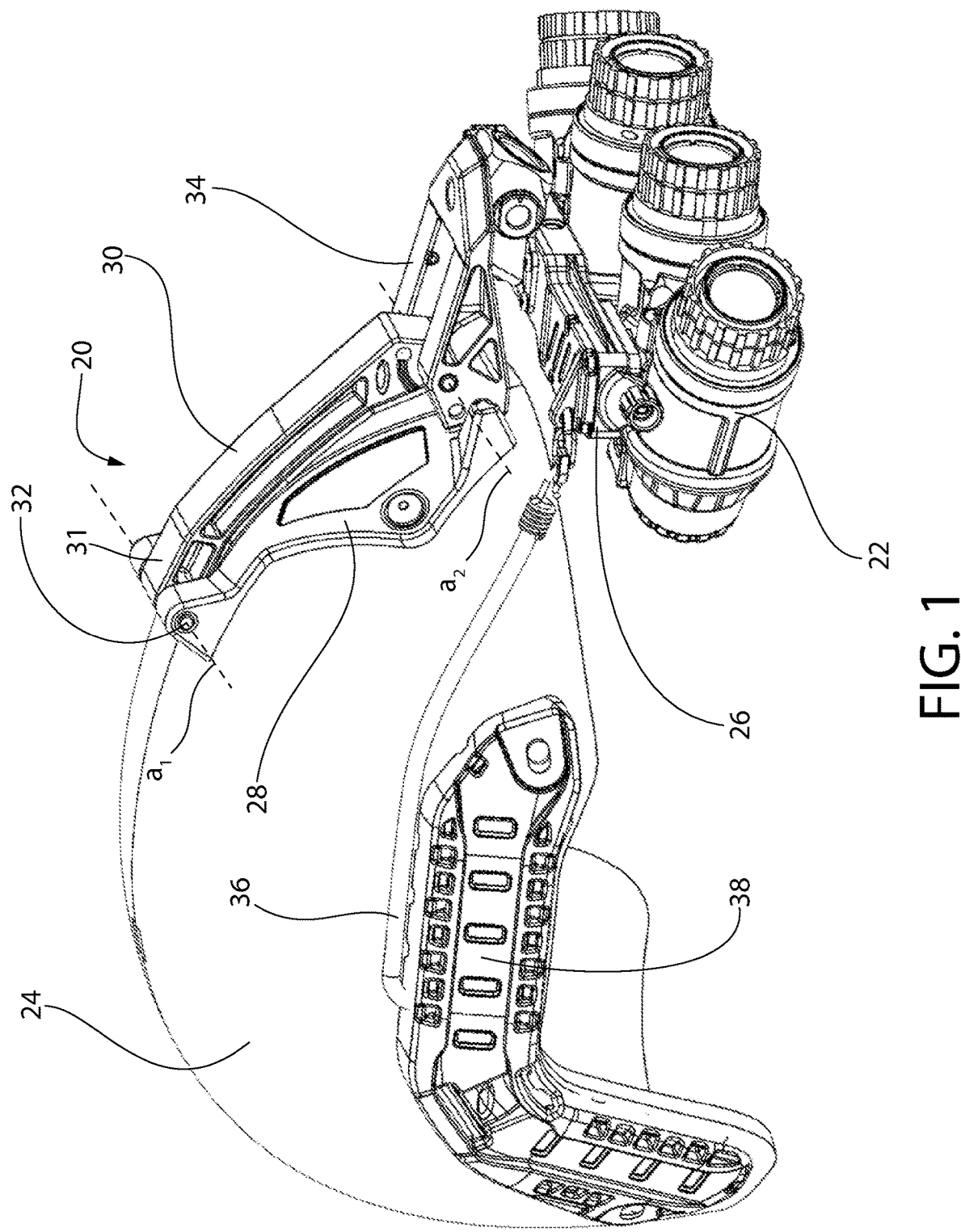
FIG. 1 is a perspective view of an accessory mount system in accordance with an exemplary embodiment of the present invention shown attached to a helmet and attached to the accessory in an in use position.
Figure 2:
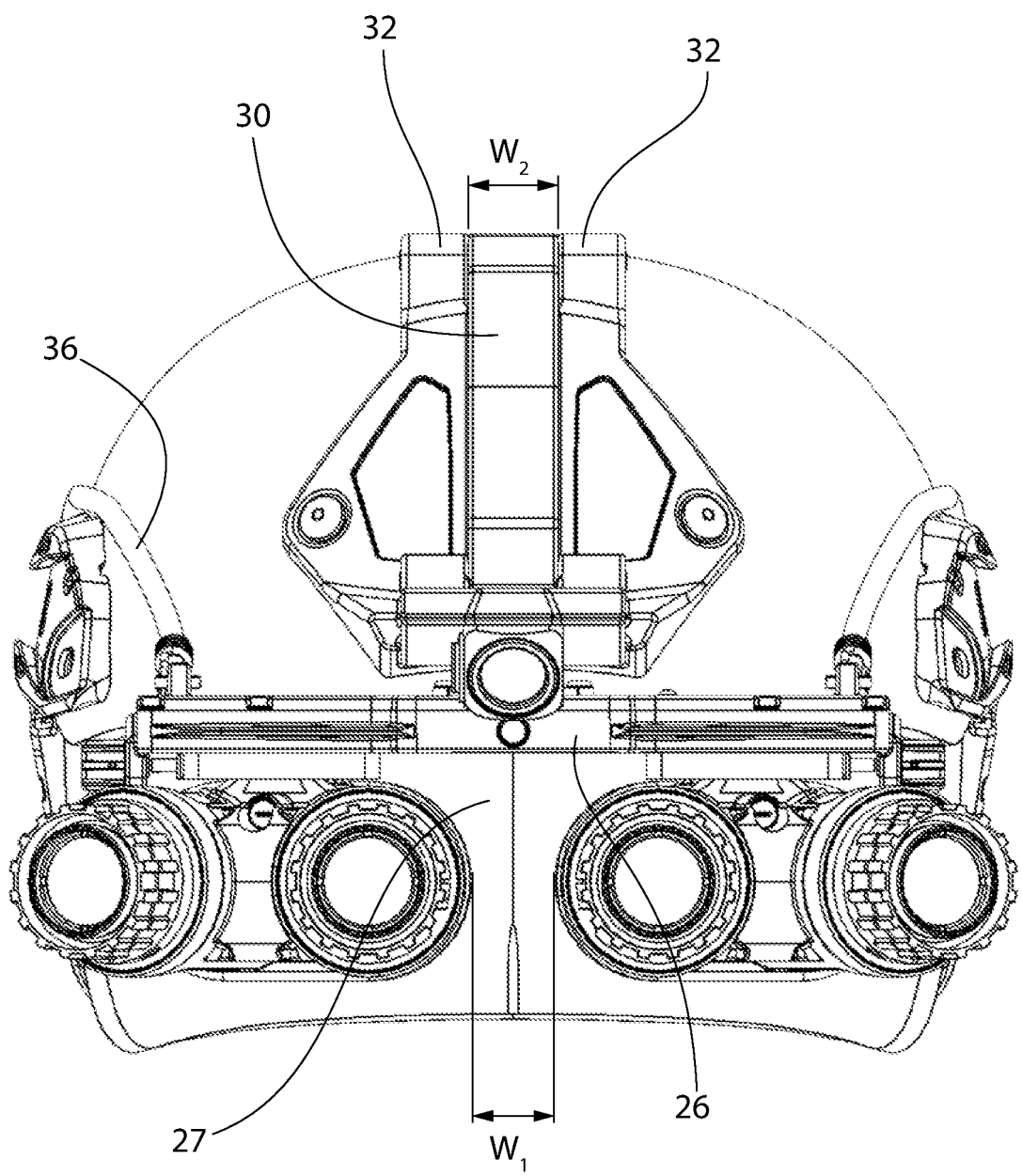
FIG. 2 is a front elevational view of the accessory mount system of FIG. 1.

Helmet systems are used by individuals operating in a variety of high-performance environments including defense forces, emergency responders, and industrial personnel. Some existing helmet systems include a mount or shroud for attaching accessories, such as night vision goggles (NVG), to helmet and allow the accessory to move between a stowed or storage position and a use position. Existing accessory mounts extend the accessory a distance from the helmet surface when the accessory is in the storage position. Such a configuration, particularly for relatively heavy accessories such as NVGs, positions the center of gravity of the helmet system away from the top of a user's head, thereby increasing strain on the user's neck as the user must counteract the resultant moment force. Existing accessory mount systems may also have a large profile that causes inadvertent collisions between the accessory and objects around a user. The ability for the user to move his or her head around accurately and quickly while wearing the helmet system with reduced effort and fatigue is particularly important in high performance environments.

Referring to the drawings in detail, wherein like reference numerals indicate like elements throughout, there is shown in FIGS. 1-14 an improved accessory mount, generally designated 20, in accordance with an exemplary embodiment of the present invention. As discussed in further detail below, the accessory mount allows for the accessory to be positioned relative to the user during use (e.g., in front of the user's eyes) and then moved to one or more compact storage configurations when not in use. The accessory mount allows for the accessory to be positioned in a storage position held close to the outer surface of the helmet when temporarily not in use. In one embodiment, the accessory is proximate the user's forehead in a first storage position. In some embodiments, the accessory mount allows for a second storage position where the accessory is flipped up away from the user's eyes proximate the user's forehead when temporarily not in use and where speed of deployment of the accessory may be more important than comfort, due to the location of the center of gravity of the helmet system. In some embodiments, the accessory mount allows for a third storage position where the accessory is positioned on top of the helmet proximate the top of the user's head for maximum comfort but where speed of deployment of the accessory may not be as important.

Referring to FIG. 1, the accessory mount 20 may be configured to couple an accessory 22 to a helmet 24. In one embodiment and as shown in the drawings, the accessory is a night vision optical device enabling viewing under nighttime or other low light conditions, such as night vision goggles (NVG), electronic night vision goggles (eNVG), night vision binoculars, or night vision monocular devices (e.g., L3 GPNVG (Ground Panoramic Night Vision Goggle). However, in other embodiments, the accessory 22 may be, but is not limited to, a light, a camera, a visor, a goggle, a communication system, a gas supply mask, and/or a face shield. The accessory 22 may be moveable from an in-use or deployed position (FIG. 1) to one or more storage positions (e.g., FIGS. 7, 10, and 12). In some embodiments, the accessory 22 can be moved from each of the first storage position (FIG. 7), second storage position (FIG. 10), and third storage position (FIG. 12) directly to the deployed position (FIG. 1). The accessory 22 may be stored in a position such that the center of gravity of the accessory is above the head of the user. The accessory 22 may be stored in a position such that the center of gravity of the helmet system is higher or closer to the top of a wearer's head than existing systems. The accessory mount 20 may allow a user to move the accessory 22 between the deployed position and a plurality of storage positions manually (e.g., with one hand). In some embodiments, the accessory can be moved from one of the storage positions to another of the storage positions without moving the accessory to the deployed position.

Referring to FIGS. 1-14, some embodiments of the accessory mount 20 include a shroud 28 coupled to the helmet 24. In other embodiments, the accessory mount 20 includes a plate (not shown) configured to engage (e.g., detachably couple to) an existing shroud. The shroud 28 may be coupled to the helmet 24 (e.g., by threaded fasteners, weld, or adhesive). The shroud 28 may include a hole pattern configured to match an existing hole pattern on the helmet 24. In some embodiments, the shroud 28 may be retrofitted onto a helmet to replace an existing shroud without drilling additional holes in the helmet. In some embodiments, the shroud 28 may have a hole pattern that requires holes to be drilled into the helmet 24. In some embodiments, the shroud 28 is permanently fixed to the helmet 24. In other embodiments, the shroud 28 is detachably coupled to the helmet 24. The shroud may include padding (e.g., rubber or a soft material) such that the accessory 22 is prevented from scraping against the shroud 28 or helmet 24 in the storage positions.

Figure 3:
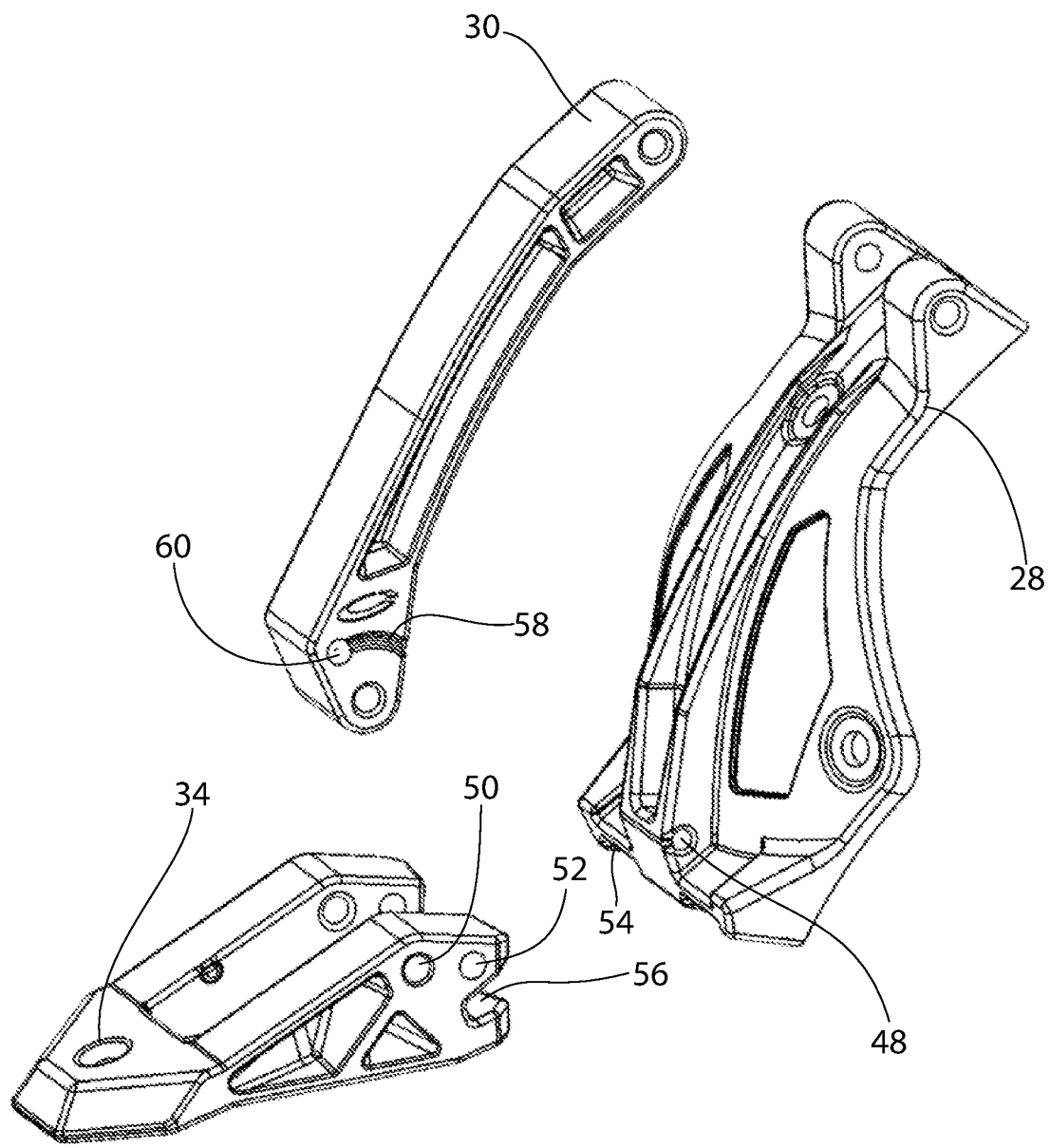
FIG. 3 is an exploded view of the accessory mount system of FIG. 1 right side elevational view of the accessory mount system of FIG. 1 shown in an extended position.
Figure 5:
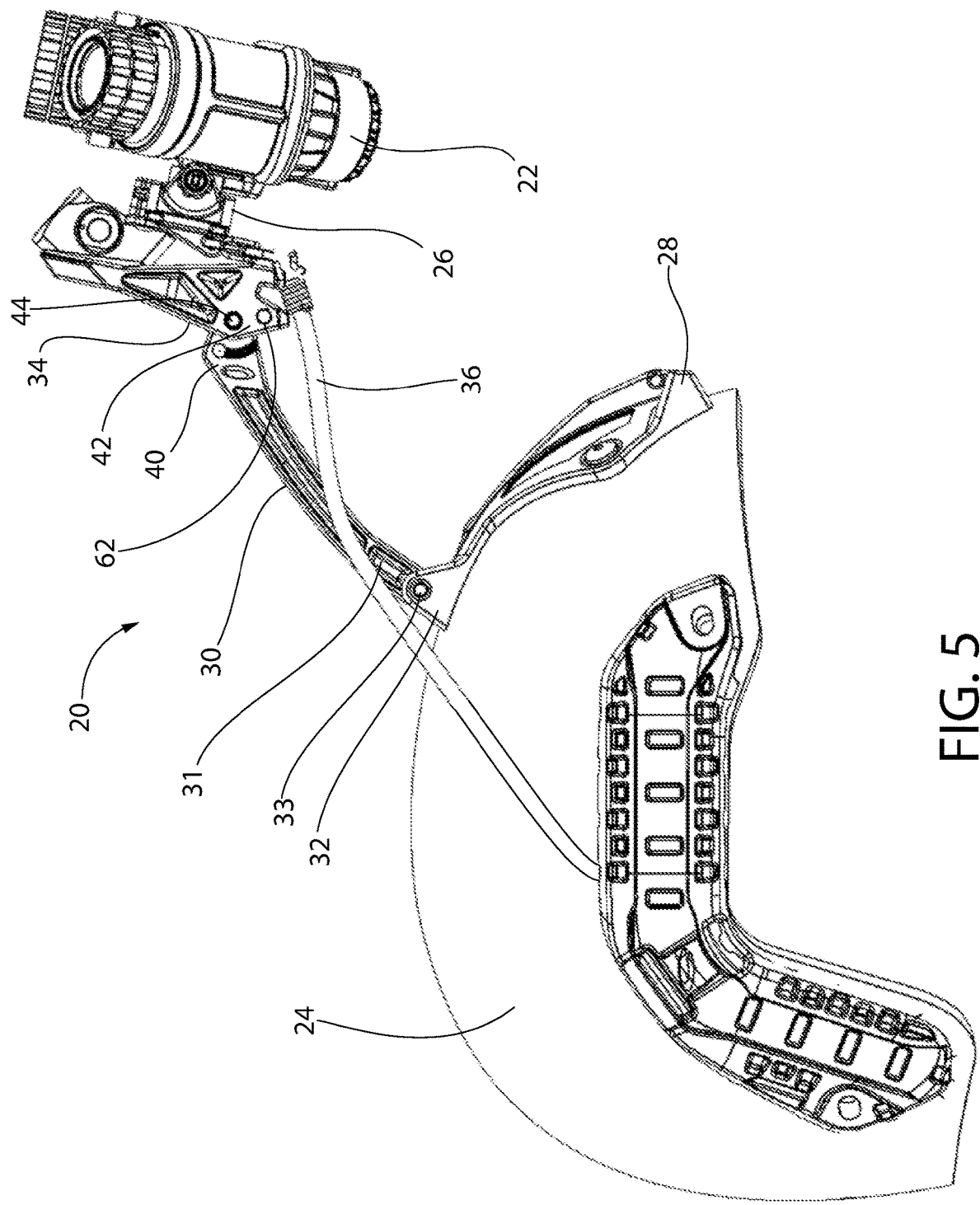
FIG. 5 is a right side elevational view of the accessory mount system of FIG. 1 in a position between the in use position and a first storage position.
Figure 6:
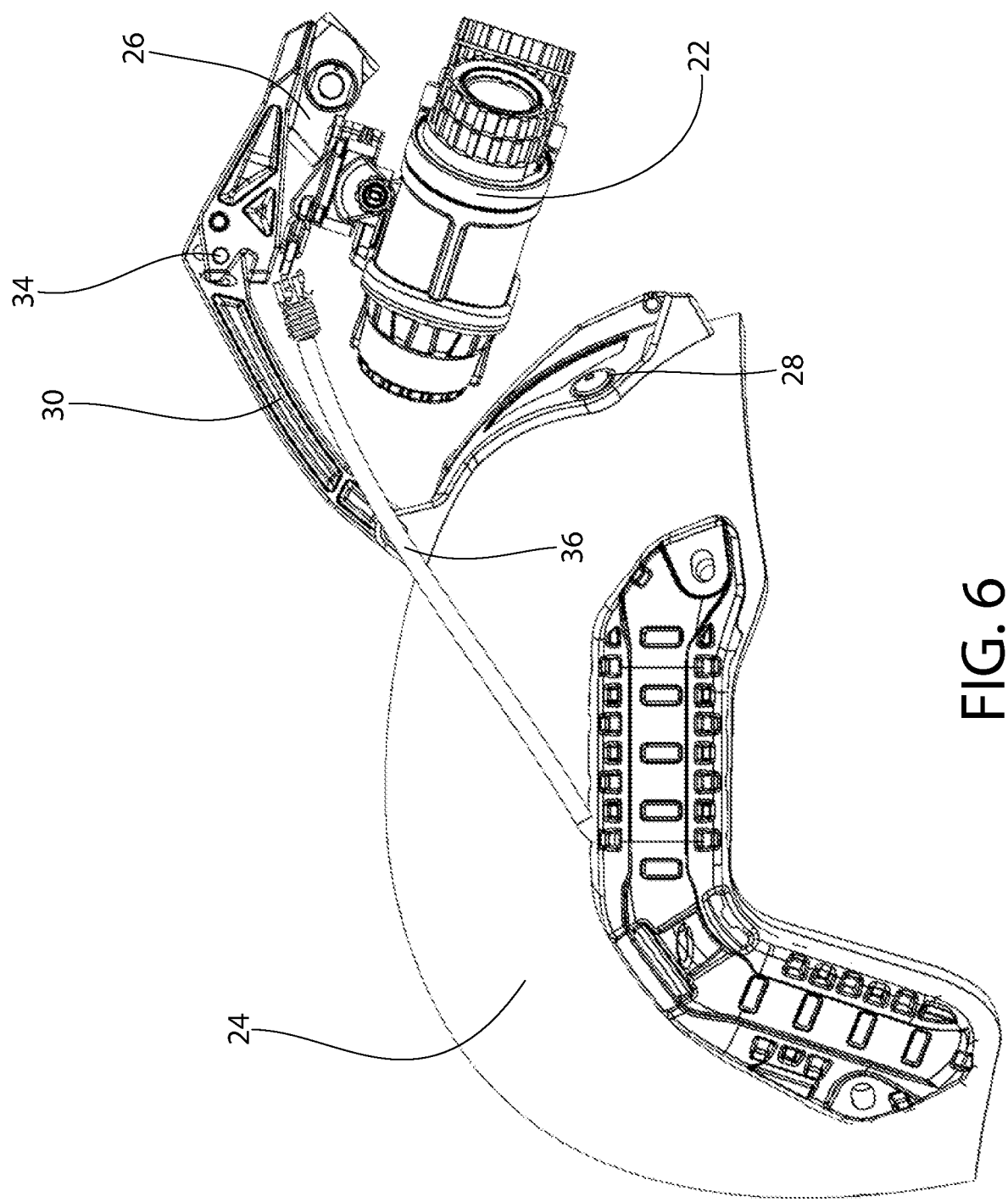
FIG. 6 is a right side elevational view of the accessory mount system of FIG. 1 in a position between the in use position and a first storage position.
Figure 7:
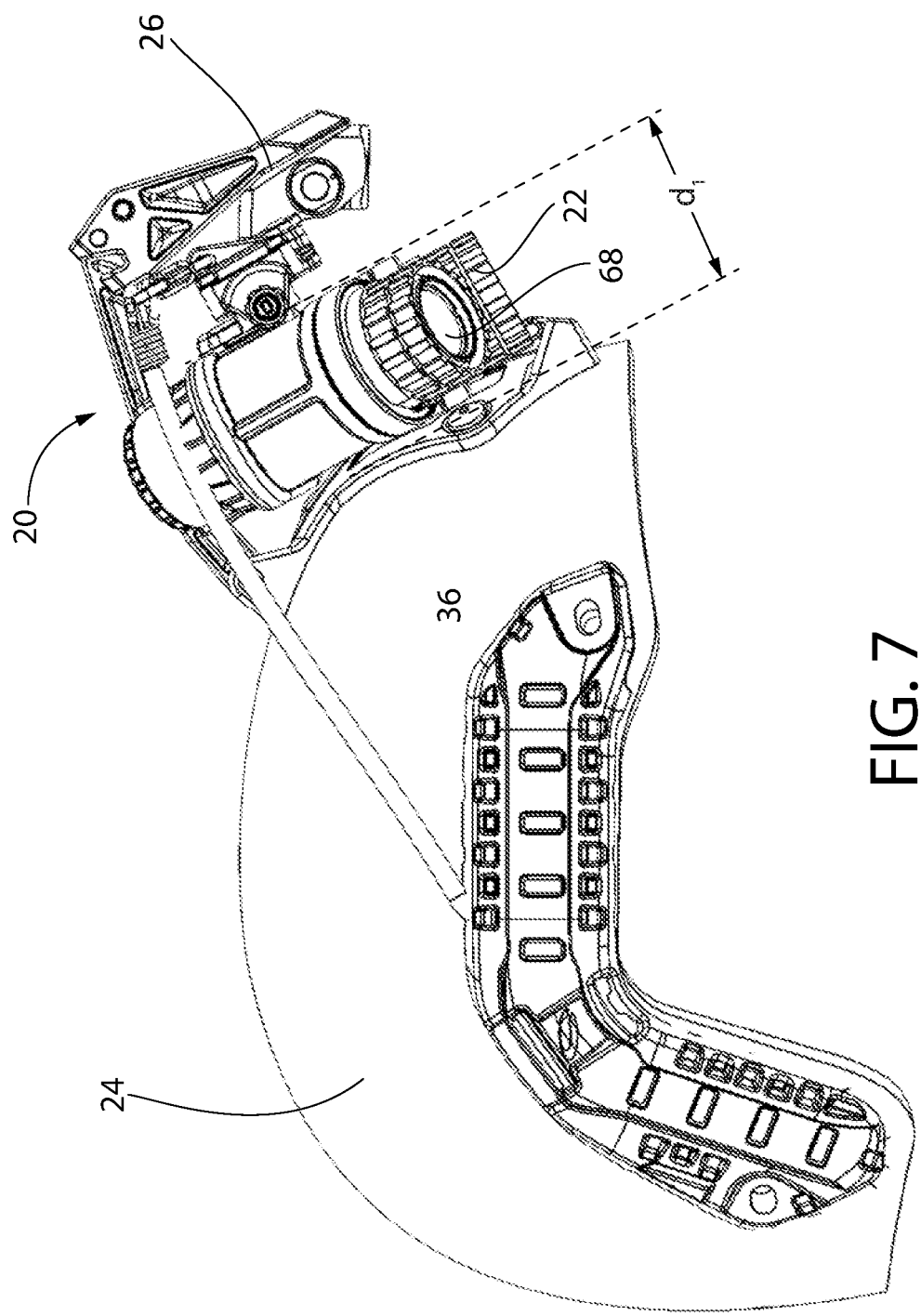
FIG. 7 is a right side elevational view of the accessory mount system shown in FIG. 1 in a first storage position.
Figure 9:
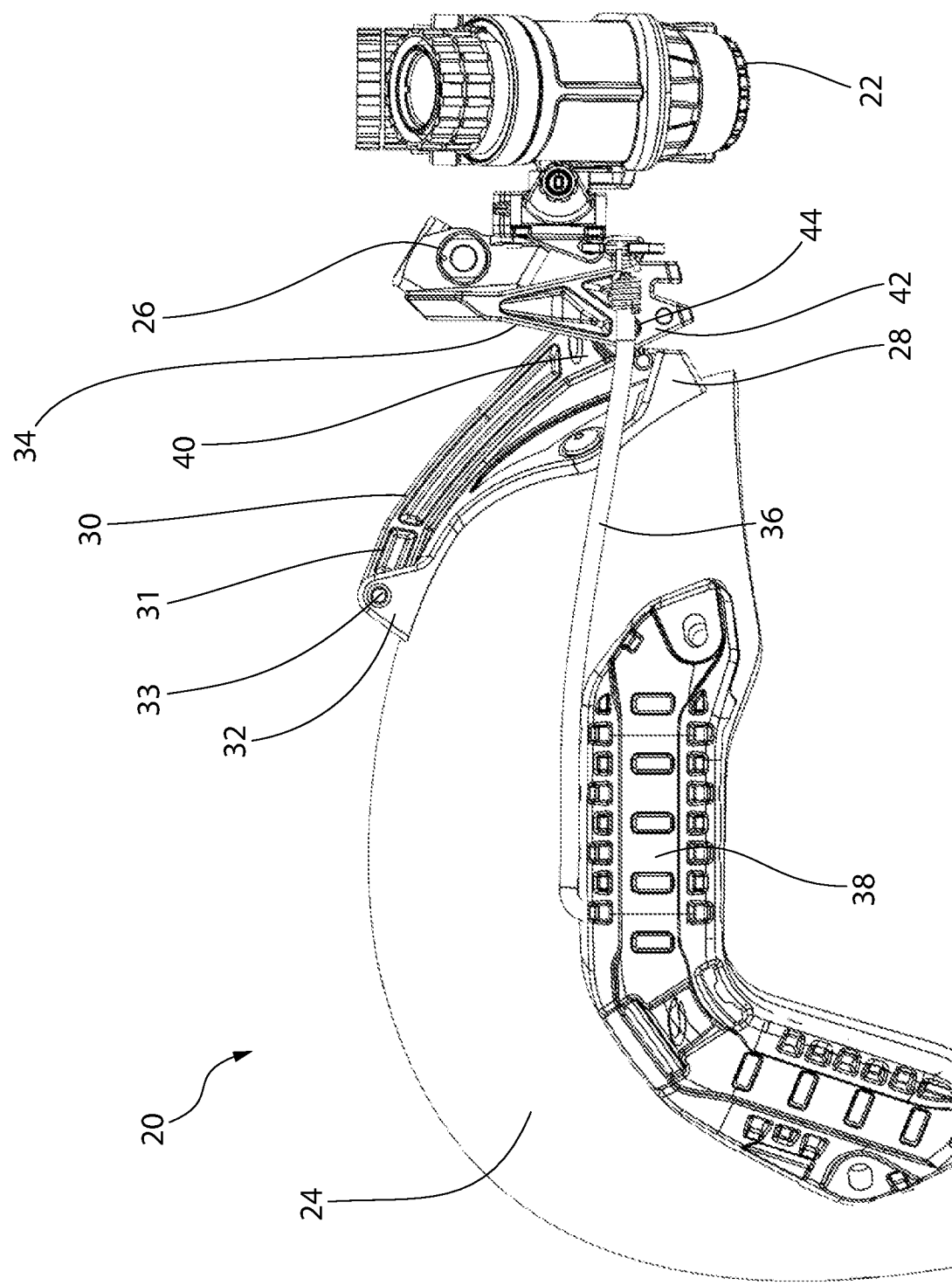
FIG. 9 is a right side elevational view of the accessory mount system of FIG. 1 shown in a position between the in use position and a second storage position.
Figure 10:
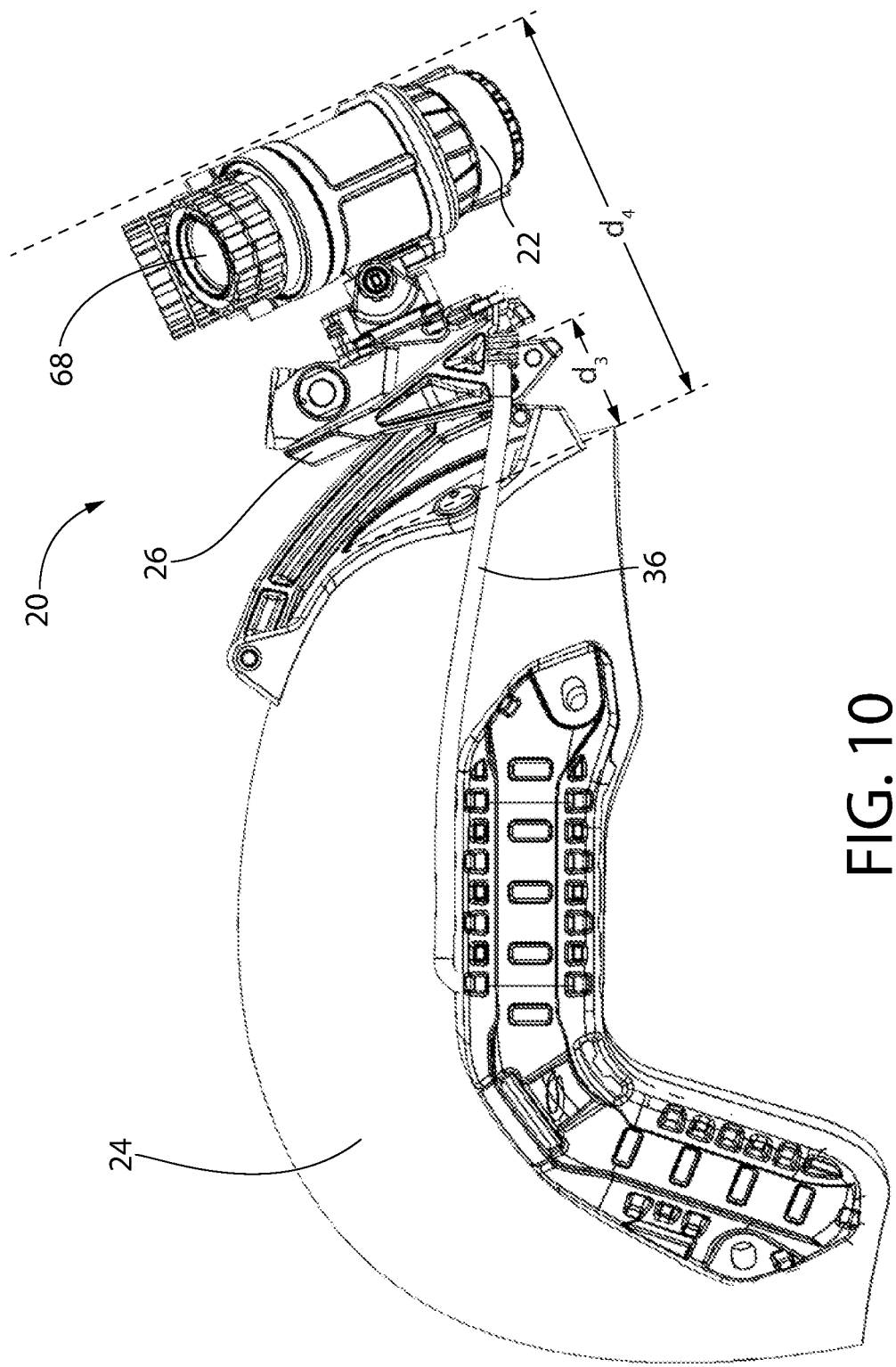
FIG. 10 is a right side elevational view of the accessory mount system of FIG. 1 in a second storage position.
Figure 12:
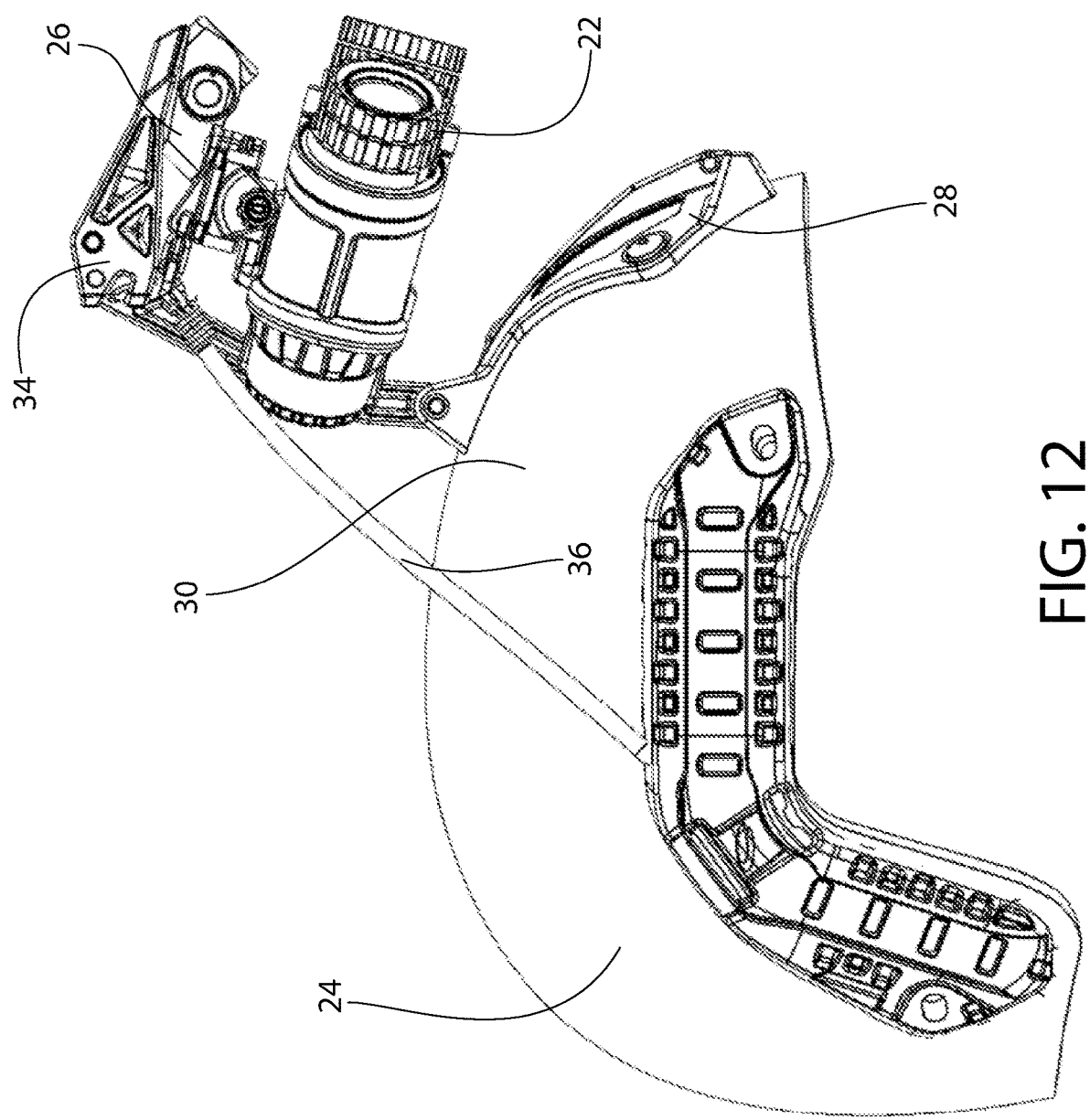
FIG. 12 is a right side elevational view of the accessory mount system of FIG. 1 shown in a position between the in use position and a third storage position.
Figure 13:
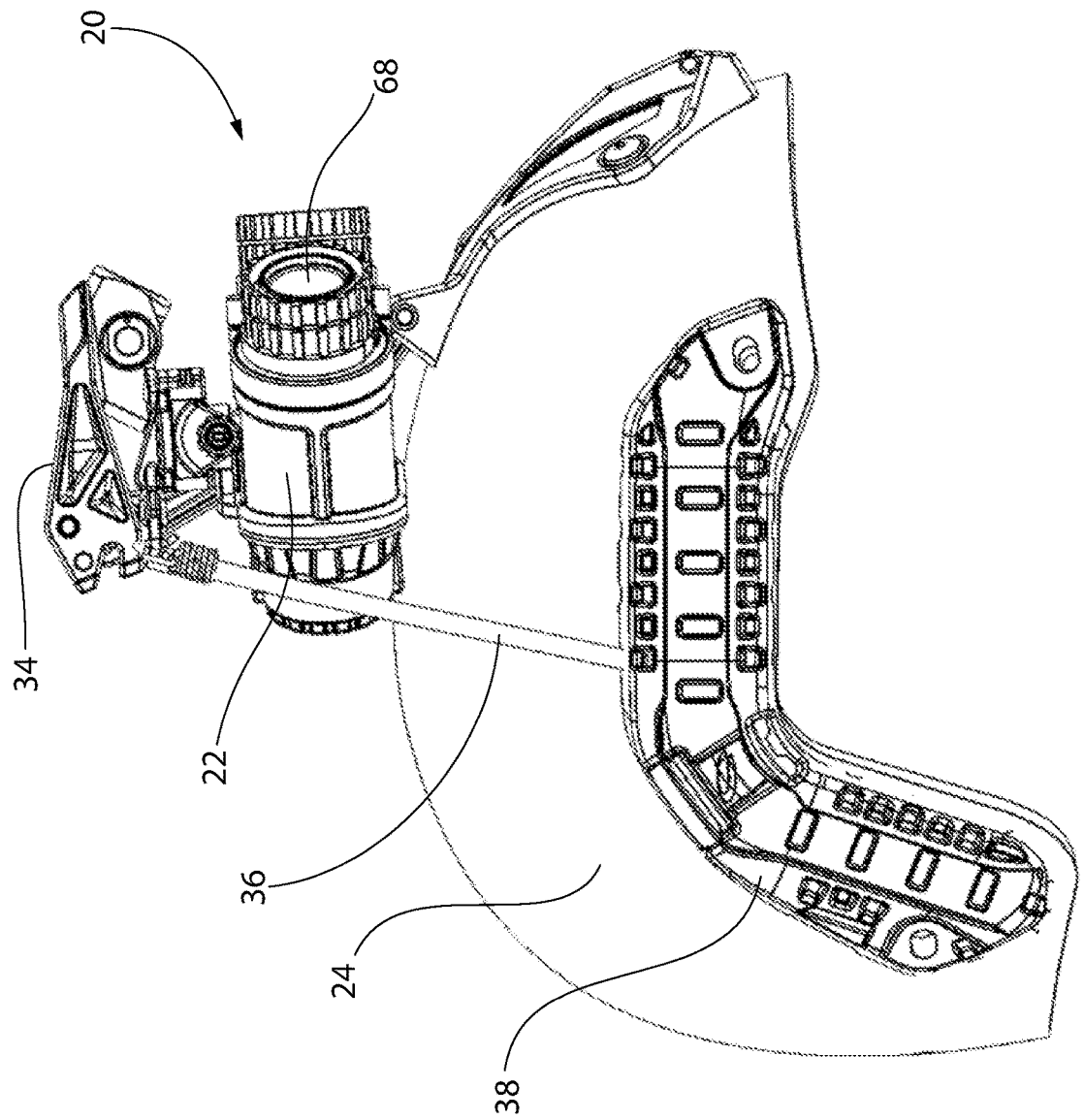
FIG. 13 is a right side elevational view of the accessory mount system of FIG. 1 shown in a third storage position.

Referring to FIGS. 1, 3, and 5, the accessory mount 20 may include one or more articulable arms to position the accessory 22 relative to the helmet 24. In one embodiment, the accessory mount 20 includes a first arm 30 having a first end 31 coupled to the shroud 28. The first arm 30 may be movably coupled to the shroud 28. The shroud 28 may include bearings 32 configured to receive an axle 33 coupling the first arm 30 to the shroud 28 such that the first arm 30 is rotatable relative to the shroud 28 about axis $a_1$ as the accessory 22 is moved between the deployed position (FIG. 1) and the first storage position (FIG. 7) or third storage position (FIG. 13). The accessory 22 may be moved from the deployed position (FIG. 1) to the first storage position (FIG. 7), for example, as shown in the sequence of FIGS. 5-7. The accessory 22 may be moved from the deployed position (FIG. 1) to the second storage position (FIG. 10), for example, as shown in the sequence of FIGS. 9-10. The accessory 22 may be moved from the first storage position (FIG. 7) to the third storage position (FIG. 14), for example, as shown in the sequence of FIGS. 7, 12, 13. The second arm 34 may rotate relative to the first arm 30 in a first direction as the accessory 22 moves from the deployed position to the first storage position or third storage position. The second arm 34 may rotate relative to the first arm 30 in a second direction, opposite the first direction, as the accessory 22 moves from the deployed position to the second storage position.

The first arm 30 may have width $w_2$ (FIG. 2) which may be thinner than arms of existing accessory mount systems. In some embodiments, the width $w_2$ is about 35 mm, about 30 mm, about 25 mm, about 20 mm, about 18 mm, about 15 mm, about 12 mm, about 10 mm, about 8 mm, about 5 mm, less than about 20 mm, less than about 15 mm, or less than about 10 mm. The first arm 30 may be sized and dimensioned to fit in a recess 27 of the accessory (e.g., between the optical tubes of NVG even when set to its lowest or minimal interpupillary distance) when the accessory 22 is in the second storage position (FIG. 10) or third storage position (FIG. 13). The recess 27 may have a width $w_1$ of about 35 mm, about 30 mm, about 25 mm, about 20 mm, about 18 mm, about 15 mm, about 12 mm, about 10 mm, about 8 mm, about 5 mm, less than about 20 mm, less than about 15 mm, or less than about 10 mm. The first arm 30 or bearings 32 may include a lock feature (e.g., a snap, detent, spring ball plunger, spring loaded lock button) to lock or retain the first arm 30 in the selected storage position.

Figure 8:
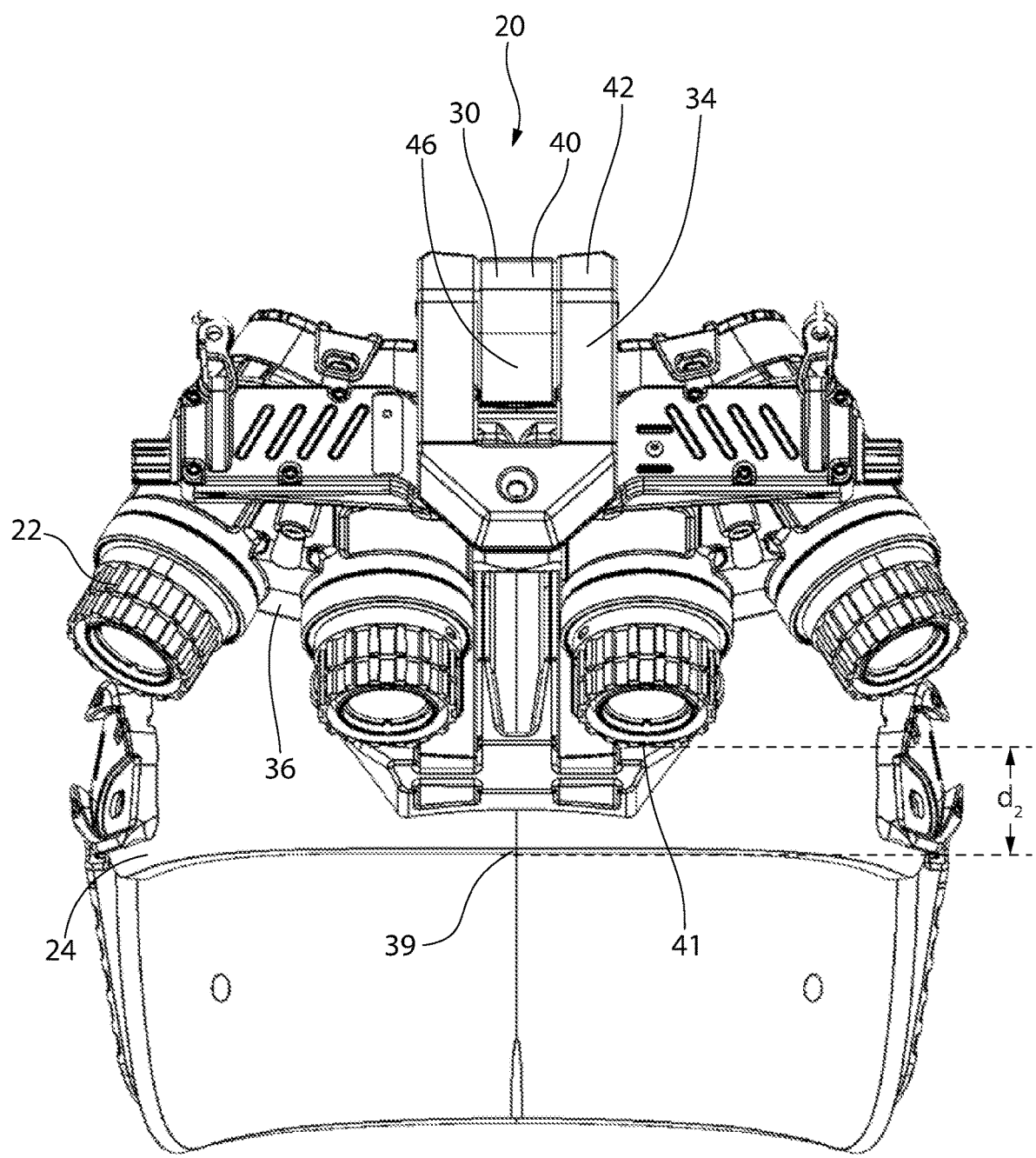
FIG. 8 is a front elevational view of the accessory mount of FIG. 1 in the first storage position.

Referring to FIG. 5, a second end 40 of the first arm 30 may be coupled to a first end 42 of a second arm 34. The first arm 30 may be movable relative to the second arm 34. An axle 44 may couple the second arm 34 to the first arm 30 such that the second arm 34 can rotate relative to the first arm 30 about axis $a_2$ (axis $a_2$ shown in FIG. 1). The first end 42 of the second arm 34 may include a channel 46 to receive the second end 40 of the first arm 30 (FIG. 8). In some embodiments, the shroud 28 and the second arm 34 are each coupled to both sides of the first arm 30. A shroud 28 or second arm 34 coupled to both sides of the first arm 30 may provide additional resistance to torsion compared to a shroud or second arm that is coupled to only one side of the first arm. In other embodiments, the first arm 30 is coupled to both sides of the shroud 28 and the second arm 34.

Figure 4:
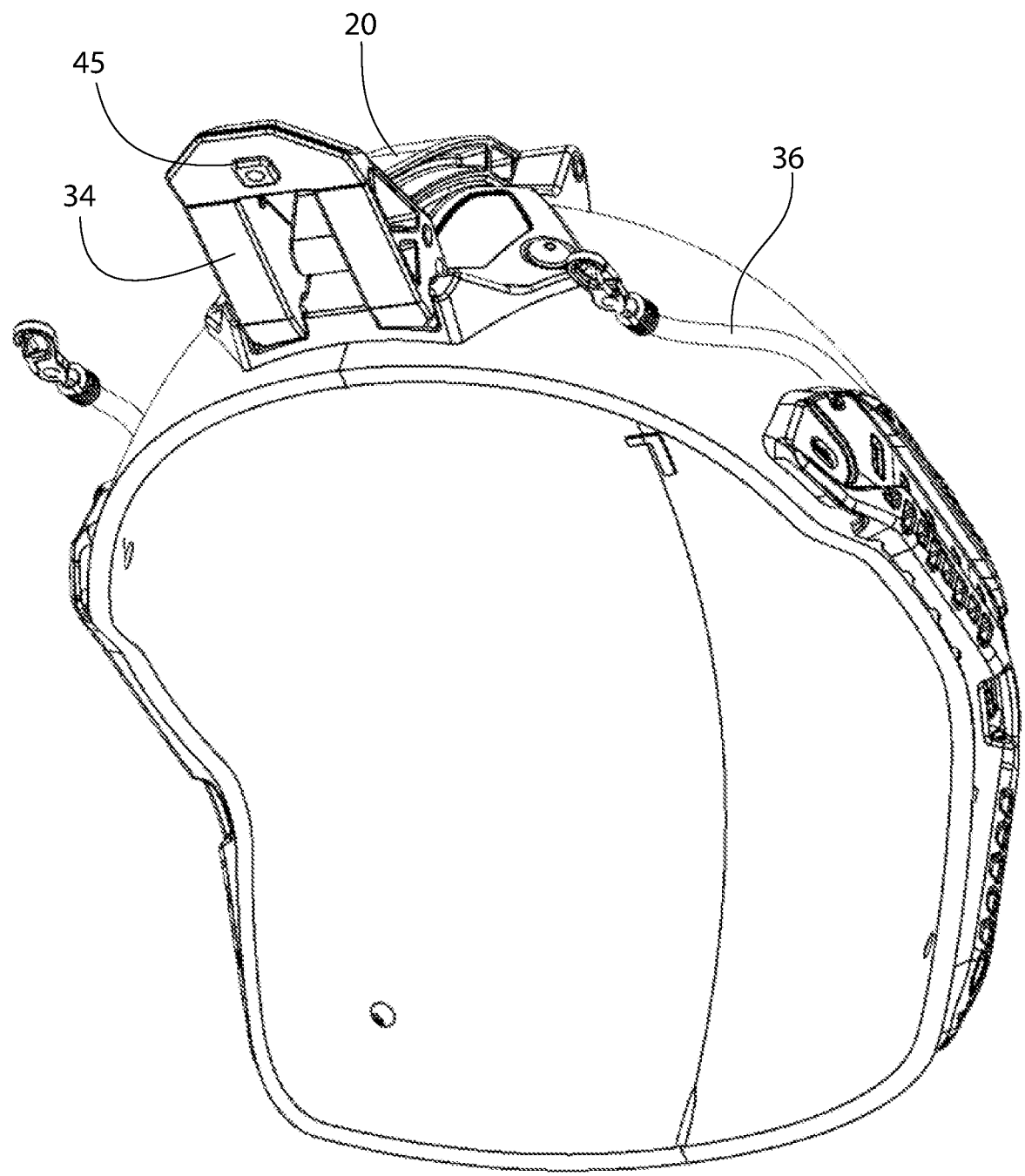
FIG. 4 is a bottom perspective view of the accessory mount system of FIG. 1 attached to a helmet.

Referring to FIG. 1, the accessory mount 20 may include an accessory interface 26. In some embodiments, the accessory interface 26 is adapted to couple to a selected accessory 22 and the second arm 34. In other embodiments, the accessory interface 26 is integrally formed with the accessory 22. The accessory 22 may be detachably coupled to the accessory interface 26. In some embodiments, the second arm 34 is adapted to receive a plurality of different accessory interfaces. Referring to FIG. 4, the second arm 34 may include an engagement feature 45 (e.g., a threaded opening, part of a hook and loop fastener, or a magnet) that couples the accessory interface 26 to the second arm 34. In some embodiments, the accessory 22 may be swapped for a second accessory without removing the accessory mount 20 from the helmet 24. The accessory interface 26 may be rotatably coupled to the second arm 34. The second arm 34 may be independently rotatable relative to each of the first arm 30 and the accessory interface 26. The accessory interface 26 may include for-aft adjustment (e.g., via a sliding member engagement) between the accessory interface 26 and the second arm 34. The accessory interface 26 may be configured to allow for angle adjustment (e.g., rotation about an axis parallel to axle 33 (FIG. 5), rotation about an axis transverse to axle 33). In some embodiments, the accessory interface 26 is vertically adjustable relative to the second arm 34. In some embodiments, the accessory interface 26 is vertically, horizontally, and/or rotationally adjustable relative to the second arm 34. A rear portion of the second arm may couple to (e.g., snap fit) a lower portion of the shroud 28 when the accessory is in the deployed position.

Referring to FIG. 3, the second arm 34 may include a first opening 50 configured to receive axle 44 that couples the second arm 34 to the first arm 30. The second arm 34 may include a second opening 52 configured to receive a locking element 62 (e.g., a spring loaded plunger as shown in FIG. 5) that at least partially retains the position of the second arm 34 relative to the shroud 28 when the accessory 22 is in the deployed position (FIG. 1). The shroud 28 may include an opening 48 configured to receive the locking element 62. The first arm 30 may include a track 58 configured to receive the locking element as the accessory 22 moves from the deployed position (FIG. 1) to the third storage position (FIG. 12). A well 60 may be formed at the end of the track 58 to help retain the accessory 22 in the third storage position when the locking element 62 is in the well 60. The well 60 may be deeper than the track 58.

Still referring to FIG. 3, the shroud 28 may include a ledge 54 configured to be positioned in the receiving area 56 of the second arm 34 when the accessory 22 is in the deployed position (FIG. 1). The ledge 54 may contact a sidewall of the receiving area 56 to at least partially take on some of the weight of the accessory 22 in the deployed position.

Referring to FIG. 1, the accessory mount 20 may include a flexible connector 36 (e.g., a bungee, rope, chain) having a first end coupled to one or more of the accessory 22, the accessory interface 26, or the second arm 34. A rail 38 may be coupled to the helmet 24. Some examples of rails contemplated for use with the present invention are described in international patent application no. PCT/US18/22221 and U.S. Pat. No. 7,849,517, the disclosure of each of which are hereby incorporated by reference in their entirety. A second end of the flexible connector 36 may include a second end coupled to the rail 38, shroud 28, or the helmet 24. The flexible connector 36 may laterally stabilize the accessary 22 and help retain the accessory 22 in each of the deployed and storage positions. The rail 38 may include a shim and the rail or shim may include a recess between a front surface of the rail 38 and the helmet 24 wherein the recess receives the flexible connector 36. The accessory mount 20 may include a switch or position sensor to automatically turn the accessory 22 off when the accessory is moved to one of the storage positions.

Referring to FIG. 1, the accessory 22 may be below the accessory interface 26 when the accessory is in the deployed position. The accessory 22 may be above the accessory interface 26 when the accessory is in the second storage position (FIG. 10). The accessory interface 26 may be between the accessory 22 and the helmet 24 when the accessory is in the second storage position (FIG. 10). In one embodiment, the accessory 22 extends the furthest from the helmet 24 in the second storage position.

The accessory 22 may be sandwiched between the surface of the helmet 24 and the accessory interface 26 when the accessory is in the first storage position (FIG. 7) or third storage position (FIG. 13). In one embodiment, the accessory interface 26 extends the furthest from the helmet 24 in the first and third storage positions. The accessory 22 may include a first end 68 (FIGS. 7, 10, and 13) that faces a first direction (e.g., frontward facing) when the accessory 22 is in the deployed position. The first end 68 may face a second direction (e.g., rearward facing) when the accessory 22 is in the second storage position. The first end 68 may face the first direction or a third direction (e.g., forward and downwardly facing) when the accessory 22 is in the first storage position or third storage position.

The accessory 22 may be raised relative to the helmet 24 and rotated toward the helmet 24 to tuck the accessory 22 in close to the helmet. In order to reposition the accessory 22 relative to the helmet 24, the first arm 30 may rotate relative to the shroud 28, the second arm 34 may rotate relative to the first arm 30, and the accessory interface 26 may rotate relative to the second arm 34 as the accessory is moved from the deployed position to the first storage position (FIG. 7) or the third storage position (FIG. 13). The accessory 22 may be closer to a surface of the helmet 24 (e.g., the surface of the helmet closest to the accessory) when the accessory 22 is in the first storage position than when the accessory 22 is in the second storage position.

A distance $d_1$ (FIG. 7) from the surface of the helmet 24 to the outer surface of the accessory 22 may be about 6 inches, about 5 inches, about 4 inches, about 3 inches, about 2 inches, less than 6 inches, less than 4 inches, about 2-4 inches, about 4-5 inches, or about 5-6 inches. An inner surface of the accessory 22 may contact the surface of the helmet when the accessory is in the first storage position. The accessory interface 26 may be above the accessory 22 when the accessory 22 is in the first storage position. The center of gravity of the accessory 22 may be closer to the surface of the helmet 24 when the accessory is in the first storage position (FIG. 7) than when the accessory 22 is in the second storage position (FIG. 10).

Referring to FIGS. 1 and 10, the second arm 34 may rotate relative to the first arm 30 as the accessory moves between the deployed position (FIG. 1) and the second storage position (FIG. 10). In some embodiments, the first arm 30 is rotationally fixed relative to the shroud 28, and the accessory interface 26 is fixed relative to the second arm 34, as the accessory 22 is moved between the deployed position (FIG. 1) and the second storage position (FIG. 10). In other embodiments, the first arm 30 rotates relative to the shroud 28 as the accessory moves from the deployed position to the second storage position. A distance $d_4$ between a surface of the accessory 22 (e.g., a surface furthest from the helmet) and a surface of the helmet (e.g., the surface closest to the accessory) may be about 6 inches, about 5 inches, about 4 inches, about 3 inches, or about 2 inches when the accessory 22 is in the second storage position (FIG. 10). A distance $d_3$ between a surface of the helmet and the accessory interface 26 may be about 0.5 inches, about 1 inch, about 1.5 inches, about 2 inches, about 2.5 inches, about 3 inches, about 4 inches, about 5 inches, about 1 to 2 inches, about 2 to 3 inches, about 3 to 4 inches, about 4 to 5 inches or less than about 6 inches when the accessory 22 is in the first storage position. The accessory 22 may be moved from the deployed position to the second storage position relatively quickly with a flip up motion.

Figure 14:
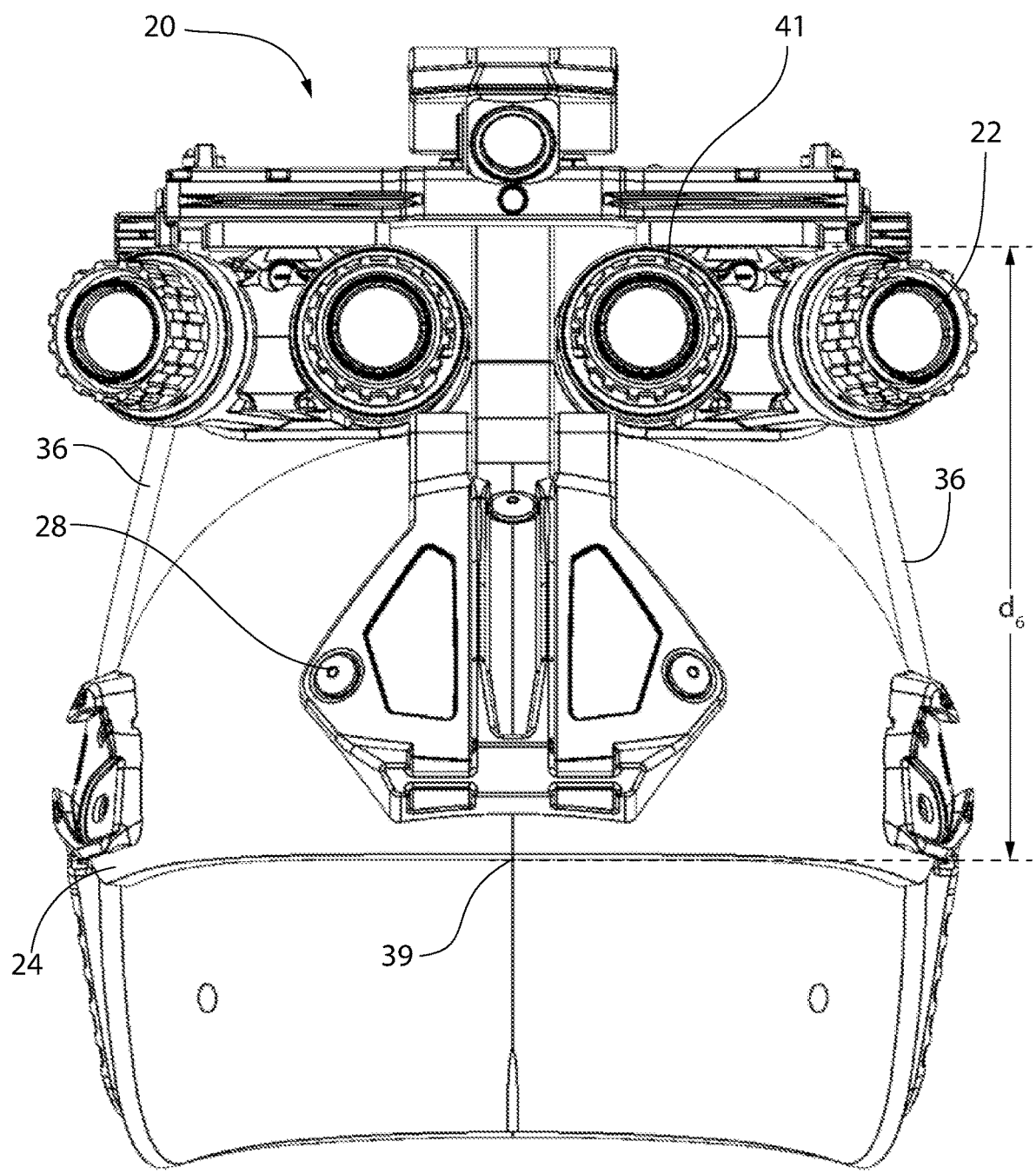
FIG. 14 is a front elevational view of the accessory mount system shown in FIG. 13.

Referring to FIGS. 12-14, the accessory 22 may be moved to the third storage position in some embodiments. A user may place the accessory 22 in the third storage position for extended storage. The strain on a user's neck from the weight or moment force created by the weight of the accessory 22 may be less when the accessory 22 is in the third storage position than in the second storage position, first storage position, or deployed position. The center of gravity of the accessory 22 may be above a user's head when the accessory is in the third storage position. The shroud 28 may be coupled to a front of the helmet 24 and the accessory 22 may be at least partially behind the shroud 28 when the accessory 22 is in the third storage position. The center of gravity of the accessory 22 may be higher in the third storage position than in any of the second storage position, first storage position, or deployed position.

To move the accessory 22 to the third storage position, the user may move the accessory 22 such that the first arm 30 rotates relative to the shroud 28 about axis $a_1$. The second arm 34 may rotate relative to the first arm 30 as the accessory 22 is moved toward a top or crown of the helmet 24. The first arm 30 may rotate relative to the shroud 28 when moving to the third storage position further than when moving to the first storage position. The accessory 22 may be moved relative to the shroud 28 until the locking element 62 is within the track 58 or well 60 (FIG. 3). At least a portion of the accessory 22 may be behind the shroud 28 when the accessory 22 is in the third storage position. In some embodiments, the second arm 34 may slide relative to the first arm 30 and/or the first arm may slide relative to the shroud 28 to move the accessory between the one or more deployed position, the first storage position, the second storage position, and the third storage position.

Figure 11:
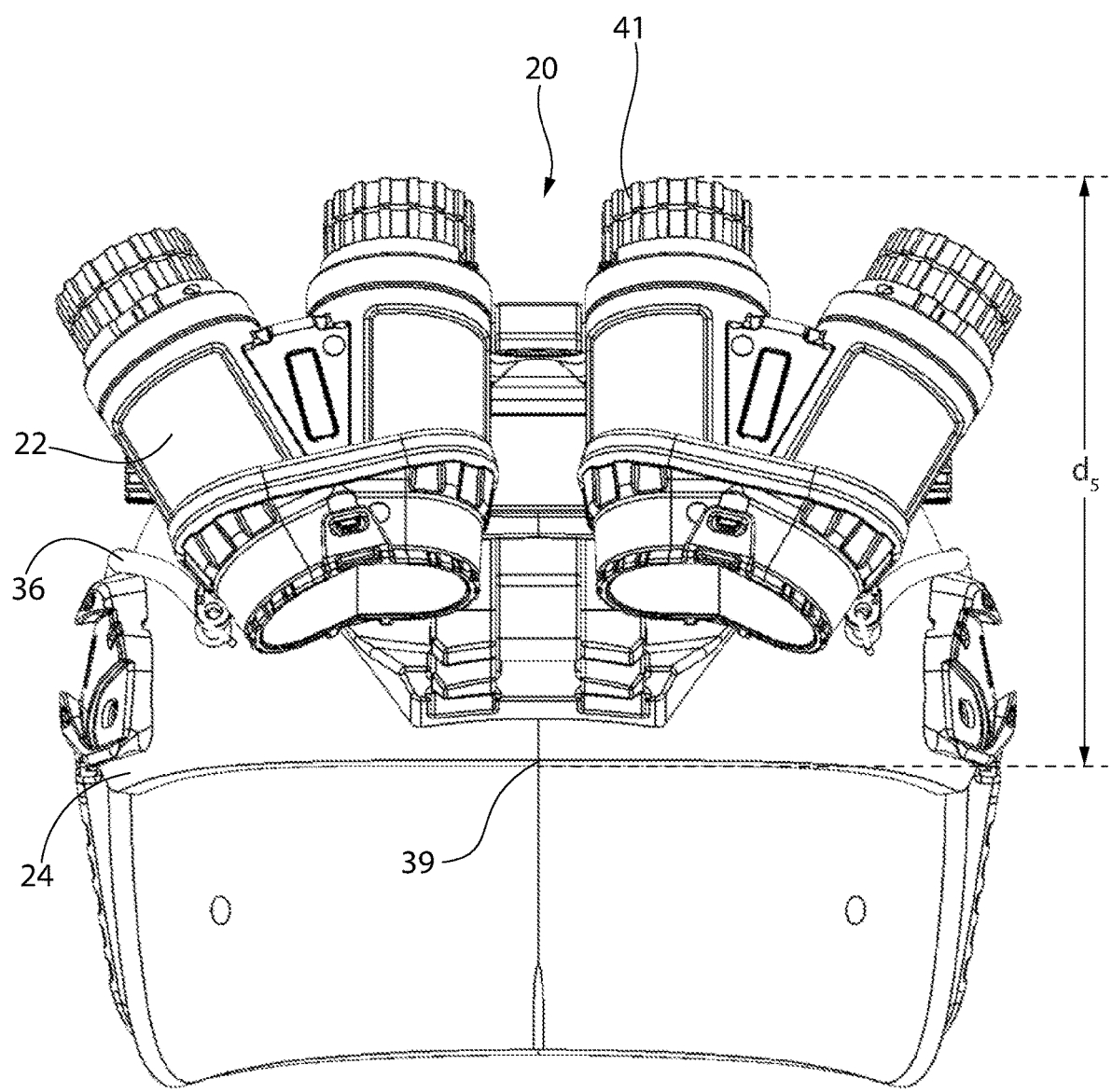
FIG. 11 is a front elevational view of the accessory mount system shown in FIG. 10 in the second storage position.

Referring to FIGS. 8, 11, and 14, an edge 41 of the accessory 22 (e.g., the edge that is distal from a user's face when the accessory is in the deployed position) may be spaced at a distance $d_2$ of about 20 mm to about 30 mm or about 26.5 from a rim 39 of the helmet 24 when the accessory 22 is in the second storage position (FIG. 11). The distance $d_5$ between the rim 39 and the edge 41 may be about 7 inches, about 6 inches, about 5 inches, about 4 inches, less than 7 inches, less than 6 inches, or less than 5 inches when the accessory 22 is in the first storage position (FIG. 8). The distance $d_6$ between the rim 39 and the edge 41 may be about 7 inches, about 6 inches, about 5 inches, about 4 inches, less than 7 inches, less than 6 inches, or less than 5 inches when the accessory 22 is in the third storage position (FIG. 14).

A method of coupling the accessory mount 20 to the helmet 24 may include coupling the shroud 28 to the helmet by placing anchors into existing bolt holes in the helmet. The shroud 28 may be retrofit onto existing helmets by removing the existing shroud and coupling shroud 28 to the helmet. The method may include moving the accessory 22 from the deployed position to one of the first storage position, the second storage position, and the third storage position. The method may include raising the accessory 22 relative to the helmet and flipping the accessory (e.g., rotating about 180°). The method may include tucking the accessory 22 close to the helmet 24 by raising the accessory 22 and moving the accessory 22 into the first storage position without flipping (e.g., rotating less than about 180°) the orientation of the accessory 22 relative to the helmet 24. The method may include moving the accessory from one of the first storage position, the second storage position, and the third storage position directly to another of the first storage position, the second storage position, and the third storage position without first moving the accessory 22 to the deployed position.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. The words "right", "left", "lower" and "upper" designate directions in the drawings to which reference is made. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

I claim:

1. A helmet accessory mount system comprising:
    a shroud configured to be coupled to a helmet, the shroud including a ledge; and
    an arm assembly including a first arm rotatably coupled to the shroud and a second arm rotatably coupled to the first arm, the second arm including an accessory interface configured to couple to an accessory,
    wherein the arm assembly is moveable from a deployed position to at least one storage position,
    wherein the accessory interface is positioned between the arm assembly and the shroud when the arm assembly is in the at least one storage position, and
    wherein the arm assembly includes a receiving area and the ledge is within the receiving area when the arm assembly is in the deployed position.

2. The helmet accessory mount system of claim 1, wherein the at least one storage position includes a first storage position and a third storage position,
    wherein the accessory interface is positioned between the arm assembly and the shroud when the arm assembly is in the first storage position proximate the front of the helmet closest to a user's forehead, and
    wherein, the accessory interface is positioned proximate a top of the helmet closest to an uppermost portion of a user's head in the third storage.

3. The helmet accessory mount system of claim 1, wherein the at least one storage position includes a first storage position and a second storage position,
    wherein the accessory interface is positioned between the arm assembly and the shroud when the arm assembly is in the first storage position proximate the front of the helmet closest to a user's forehead, and
    wherein the arm assembly is positioned between the accessory interface and the shroud proximate the front of the helmet closest to a user's forehead in the second storage position.

4. The helmet accessory mount system of claim 3, wherein the first arm is rotationally fixed relative to the shroud as the arm assembly moves from the deployed position to the second storage position.

5. The helmet accessory mount system of claim 4, wherein the second arm rotates relative to the first arm as the arm assembly moves from the deployed position to the second storage position.

6. The helmet accessory mount system of claim 4, wherein the second arm flips from the deployed position to the second storage position.

7. The helmet accessory mount system of claim 1 further comprising:
    an accessory coupled to the accessory interface,
    wherein the first arm is positioned within a recess of the accessory when the arm assembly is in the at least one storage position.

8. The helmet accessory mount system of claim 1 further comprising:
    an accessory coupled to the accessory interface, wherein the accessory is within 150 millimeters of a surface of a helmet when the accessory is in the at least one storage position.

9. The helmet accessory mount system of claim 1, wherein at least one of the second arm assembly and the shroud includes a locking element that selectively prevents the arm assembly from moving relative to the shroud when the arm assembly is in the deployed position.

10. The helmet accessory mount system of claim 9, wherein the first arm includes a track and the locking element is within the track when the arm assembly is in the at least one storage position.

11. The helmet accessory mount system of claim 1, wherein the first arm rotates relative to the shroud and the second arm rotates relative to the first arm when the arm assembly moves from the deployed position to the at least one storage position.

12. The helmet accessory mount system of claim 11, wherein the first arm and the second arm rotate simultaneously when the arm assembly moves from the deployed position to the at least one storage position.

13. The helmet accessory mount system of claim 1, wherein the helmet includes an outer surface,
    wherein the accessory includes an accessory surface, and
    wherein a distance from the outer surface to the accessory surface is less than one inch when the arm assembly is in the at least one storage position.

14. The helmet accessory mount system of claim 1, wherein the second arm is adjacent opposing sides of the first arm when the arm assembly is in the at least one storage position.

15. A helmet accessory mount system comprising:
    a shroud configured to be coupled to a helmet, the shroud including a ledge;
    a first arm having a first end rotatably coupled to the shroud;
    a second arm rotatably coupled to a second end of the first arm; and
    an accessory interface coupled to the second arm and moveable between a deployed position and a plurality of storage positions, the accessory interface configured to releasably couple to an accessory,
    wherein the accessory interface is positioned between the first arm and the shroud when the accessory interface is in a first position of the plurality of storage positions,
    wherein the first arm is positioned between the accessory interface and the shroud when the accessory interface is in a second position of the plurality of storage positions, and
    wherein the arm assembly includes a receiving area and the ledge is within the receiving area when the arm assembly is in the deployed position.

16. The helmet accessory mount system of claim 15, wherein the accessory interface is configured to be proximate a top of the helmet closest to an uppermost portion of a user's head when the accessory interface is in a third position of the plurality of storage positions.

17. A helmet accessory mount system comprising:
a shroud including an opening and configured to be coupled to a helmet;
an arm assembly including a first arm rotatably coupled to the shroud and a second arm rotatably coupled to the first arm; and
an accessory interface coupled to the second arm and configured to couple to an accessory,
wherein the arm assembly is moveable from a deployed position to at least one storage position,
wherein the accessory is configured to be positioned between the accessory interface and the helmet when the arm assembly is in the at least one storage position,
wherein the second arm includes a locking element releasably attaching to the opening of the shroud when the arm assembly is in the deployed position, and
wherein the first arm includes a track and the locking element is within the track when the arm assembly is in the at least one storage position.

\* \* \* \* \*